United States Patent Office 3,119,869
Patented Jan. 28, 1964

---

3,119,869
ABIETYL OXAMIDES AS THIXOTROPIC GREASES
Thornton P. Traise, Chicago Heights, Ill., assignor to Standard Oil Company, Chicago, Ill., a corporation of Indiana
No Drawing. Filed Dec. 23, 1960, Ser. No. 77,856
1 Claim. (Cl. 260—557)

This invention relates to novel amides and to their use as thickening agents to make thixotropic greases.

In the operation of machinery for intermittent service, it is frequently desirable to have a lubricant which will possess the consistency of a grease and thus remain in place during periods of non-use, but which will have the fluidity and lubricity of a liquid oil when the equipment is in operation. Lubricants of this type, termed "thixotropic greases," are well known. Few, however, are able to combine effective thixotropy with other desiderata of greases, such as temperature and mechanical stability.

A primary object of the invention is to provide an improved thixotropic grease capable of lubricating over broad ranges of temperature. Another object is to produce a thixotropic grease which is an attractive, bright and smooth gel. A further object is to provide a thixotropic material which rapidly reverts to its original grease consistency after repeated periods of mechanical working. Yet an additional object is to produce novel amide compounds. Other and more particular objects will become apparent as the description herein proceeds in detail.

According to the invention, it has been discovered that superior thixotropic greases are obtained when a normally liquid lubricant vehicle is thickened to grease consistency with one or more abietyl oxamide compounds having the general formula

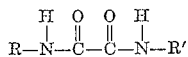

where R and R' are the same or different abietyl radicals selected from the group consisting of a dehydroabietyl radical, a dihydroabietyl radical, and tetrahydroabietyl radical. The radicals R and R' can contain substituents such as, for example, alkyl, alkoxy, cyano, aryl, hydroxy, carboxy, halogen, nitro and other substituent group.

The general structural formula of the abietyl radicals are:

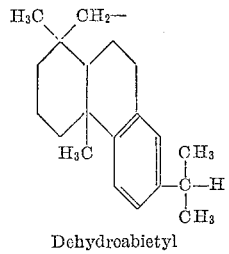
Dehydroabietyl (II)

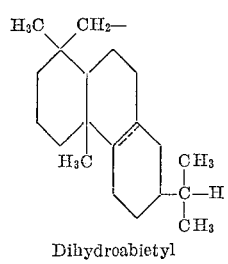
Dihydroabietyl (III)

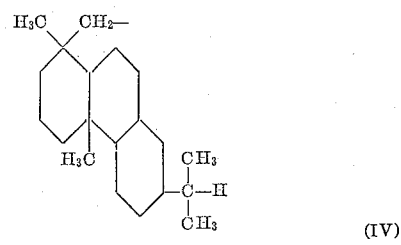
Tetrahydroabietyl (IV)

The inventive compounds can be prepared for example, by heating a mixture of an abietyl amine and an oxalic acid diester in the equivalent weight ratio of 1:1, at a temperature within the range of room temperature (about 20° C.) to about 220° C. in the presence of a basic catalyst. Strong bases, i.e. those which ionize completely in water such as NaOH, or their precursors such as metallic Na or other alkali metals, appear to offer the most rapid reaction rates, particularly when finely divided. Any diester may be used, e.g. those of alkanols having 1–5 carbon atoms each, such as methyl, ethyl, propyl, i-butyl, t-butyl, etc. The alkanol by-product may be volatilized off during reaction.

Examples of abietyl amines, i.e. aliphatic amines attached to an alicyclic structure, which can be used in the preparation of the above described ureido compounds are dehydroabietyl amine, dihydroabietyl amine and tetrahydroabietyl amine or mixtures of such amines. A particularly well suited amine is a product marketed by Hercules Powder Company as "Rosin Amine D." The product is prepared by the catalytic hydrogenation of "Rosin Nitrile D" prepared by the action at elevated temperatures of ammonia on hydrogenated rosin. Distilled and undistilled grades are available as "Amine 750" and "Amine 751." The "Rosin Amine D" is a mixture of abietyl amines in the following approximate proportion:

Rosin Amine D, percent
Dehydroabietyl amine _____ 60
Dihydroabietyl amine _____ 30
Tetrahydroabietyl amine _____ 10

The following is illustrative of the apparent reaction which takes place in the preparation of the inventive thickener.

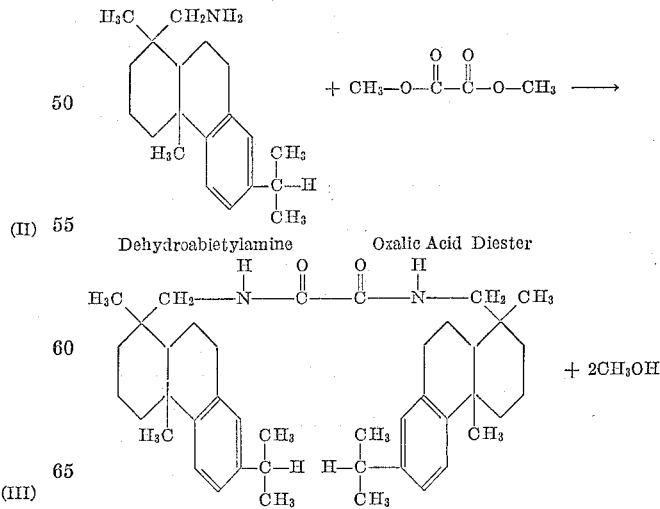

The compounds above defined and described have been found to be exceptionally effective as oil-thickeners to obtain lubricating grease compositions which exhibit good thixotropic properties, high thermal stability, and high drop points. Such grease compositions are obtained by incorporating in a suitable normally liquid oleaginous lubricant vehicle from about 2% to about 25% by weight, of at least one compound having the above. The grease can be prepared by placing the desired amount of the diester of oxalic acid and abietylamine in a high temperature greasekettle, or other suitable heating equipment. To the mixture is added less than a percent or so of sodium metal catalyst, and the mixture heated to a temperature of about 20 to 220° C. (advantageously at least high enough to boil off the alkanol), and maintained at said temperature for 0.1–10 hours. The lubricant vehicle may then be added, or else the mixture may first be cooled and washed with alcohol or ether and then reheated. The thickener and vehicle form a homogeneous gel at about 105–110° C.; other additives may be added at this stage. The grease product is then cooled—either slowly without agitation or by shock cooling—and may optionally be finished by cooling and milling. The preparation of greases of the herein described invention lends itself very favorably to either batch or continuous manufacture methods.

Oleaginous lubricant vehicles which can be thickened with the herein described compounds to form greases of the present invention can be mineral lubricating oils, silicone polymer oils, synthetic hydrocarbon lubricating oils, synthetic lubricating oils such as polyalkylene glycols and their derivatives, high molecular weight esters of dicarboxylic acids, polyfluoro derivatives of organic compounds such as the trifluorovinyl chloride polymers known as "fluorolube" (made by Hooker Chemical Company) and the trifluorochloroethylene polymers, known as "Kel-F–40" (made by The M. W. Kellogg Company), and other lubricant vehicles.

Other oleaginous vehicles which may be employed herewith are, for example, mineral oils in the lubricating oil viscosity range, e.g. from about 50 S.S.U. at 100° F. to about 300 S.S.U. at 210° F. These mineral oils may be suitably solvent extracted, with phenol, furfural, B,B′-dichlorodiethylether (Chlorex), liquid $SO_2$, nitrobenzene, etc. Synthetic lubricating oils resulting from polymerization of unsaturated hydrocarbons or other oleaginous materials within the lubricating oil viscosity range such as high molecular weight polyoxyalkylene compounds such as polyalkylene glycols and esters thereof, aliphatic diesters of dicarboxylic acids such as the butyl, hexyl, 2-ethylhexyl, decyl, lauryl, etc. esters of sebacic acid, adipic acid, azeleic acid, etc., may be thickened by the compounds of the present invention to produce excellent greases. Polyfluoro derivatives of organic compounds, particularly hydrocarbons, in the lubricating oil viscosity range, and other synthetic oils, such as esters of aliphatic carboxylic acids and polyhydric alcohol, e.g. trimethylolpropane pelargonate, pentaerythritol hexanoate, can be used as suitable oil vehicles.

The following examples illustrate the preparation, use in greases, and testing of the inventive compounds.

EXAMPLE I

Two moles of "Rosin Amine D" and one mole of diethyl oxalate were charged to a glass flask and a small amount of sodium metal added to catalyze the reaction. The mixture was heated over a period of 5–6 hours to 165° C., during which time the ethanol by-product was removed as a vapor. The crude reaction product melted at 104–105° C. It was predominately dehydroabietyloxamide.

EXAMPLE II

A mineral oil base grease was prepared by heating 14 parts of the above reaction mixture with 86 parts by weight of a solvent extracted SAE 40 base oil to 120° C. Upon slowly cooling the grease to room temperature without agitation, a grease having an unworked ASTM penetration of 215–220 was prepared. It had a drop point of 169° F. Even after standing at room temperature for several months, no leakage was observed.

EXAMPLE III

A grease was prepared according to the procedure of Example II, except that the heated thickener-oil mixture was shock chilled to below room temperature in a few seconds on a conventional chilling roll. The resultant grease had an unworked ASTM penetration of 203 and a drop point of 172° F.

*Wheel bearing test.*—This test measures the ability of bearing grease to resist leakage. The grease is applied to a modified front wheel hub and spindle. The hub is rotated at 660±30 r.p.m. for 6 hours. Leakage of oil is measured by weighing the parts and the condition of the bearings is recorded. This test is run at ambient temperatures.

The measured internal temperature was 150–155° F. There was no leakage or slumping of either grease in the hub or spindle, and the bearings remained well lubricated. Even after 12 hours there was no slumping or leakage.

*Rate of recovery.*—Samples of thixotropic greases are worked until they become fluid; then, as the grease recovers its consistency, penetration measurements are made.

*Penetration*

| Time Elapsed (After Working) | Example II | Example III |
|---|---|---|
| 1 min | 329 | 292 |
| 5 min | 300 | 260 |
| 15 min | 276 | 243 |
| 1 hr | 247 | 223 |
| 2 hr | 235 | 211 |
| 18 hr | 223 | 179 |

*Mechanical stability.*—The grease of Example III is worked in an ASTM grease worker, then allowed to stand for 24 hours before penetration measurements are made.

| No. of Strokes: | Penetration |
|---|---|
| 5,000 | 214 |
| 10,000 | 250 |
| 20,000 | 266 |
| 50,000 | 310 |

These data show that both greases are outstanding, with the shock-chilled grease of Example III giving a somewhat better yield, recovering its consistency faster, and having a slightly higher drop-point than the slow-cooled samples. The wheel-bearing test showed that both greases are excellent for lubricating and sealing anti-friction bearings.

Acceptable thixotropic properties are apparently confined to the specific types of greases described herein. Octadecyloxamide was found to be an inefficient thickener for lubricating grease; this grease was thixotropic but very slowly reversible. Attempts to make a higher melting thickener by reacting ethyl oxalate with aromatic amines such as p-chloroaniline or toluidine were unsuccessful, as the thickener could not be satisfactorily dispersed in the oil. Dehydroabietylmalonamide, dehydroabietylsuccinamide, and dehydroabietyladipamide were not able to thicken oil.

The grease product of the present invention can contain one or more well known additives or addition agents to impart various desired properties thereto such as, by way of example, antioxidants, extreme pressure agents, corrosion inhibitors, anti-leak agents, anti-foam agents, mineral lubricants such as graphite, molybdenum sulfide, etc.

I claim:

An abietyl oxamide having the formula

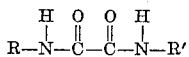

wherein R and R' are unsubstituted abietyl radicals selected from the group consisting of a dehydroabietyl radical, a dihydroabietyl radical, and a tetrahydroabietyl radical.

References Cited in the file of this patent

UNITED STATES PATENTS

| | | |
|---|---|---|
| 2,609,380 | Goldstein et al. | Sept. 2, 1952 |
| 2,710,840 | Swakon et al. | June 14, 1955 |
| 2,710,841 | Swakon et al. | June 14, 1955 |
| 2,965,676 | Fierce et al. | Dec. 20, 1960 |

OTHER REFERENCES

Bergmann: "The Chemistry of Acetylene and Related Compounds," page 80 (1948).